United States Patent
Takamura et al.

(10) Patent No.: US 9,015,633 B2
(45) Date of Patent: Apr. 21, 2015

(54) DATA MANAGEMENT APPARATUS AND METHOD FOR ORGANIZING DATA ELEMENTS INTO MULTIPLE CATEGORIES FOR DISPLAY

(75) Inventors: Seiichi Takamura, Saitama (JP); Takayuki Ishida, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 1098 days.

(21) Appl. No.: 12/238,654

(22) Filed: Sep. 26, 2008

(65) Prior Publication Data

US 2009/0106705 A1    Apr. 23, 2009

(30) Foreign Application Priority Data

Oct. 22, 2007 (JP) ................................ 2007-274276
Oct. 22, 2007 (JP) ................................ 2007-274277

(51) Int. Cl.
G06F 3/048     (2013.01)
G06F 3/0482    (2013.01)
G06F 3/0481    (2013.01)

(52) U.S. Cl.
CPC .......... *G06F 3/0482* (2013.01); *G06F 3/04815* (2013.01)

(58) Field of Classification Search
CPC .................... G06F 17/30873; G06F 17/30126; G06F 17/30112; G06F 3/048; G06F 3/04812; G06F 3/04815
USPC ......... 715/848–853, 765, 781, 782, 839, 846, 715/863, 864, 866
See application file for complete search history.

(56) References Cited

U.S. PATENT DOCUMENTS 5,835,094 A * 11/1998 Ermel et al. .................. 715/848
5,898,435 A *  4/1999 Nagahara et al. ............. 715/841
(Continued)

FOREIGN PATENT DOCUMENTS

JP        11175534 A    7/1999
JP     2001351127 A   12/2001
(Continued)

OTHER PUBLICATIONS

Demsar et al., FreeViz—An intelligent multivariate visualization approach to explorative analysis of biomedical data, Apr. 20, 2008, Journal of Biomedical Informatics, pp. 661-664.*

(Continued)

*Primary Examiner* — James T Durkin
(74) *Attorney, Agent, or Firm* — Matthew B. Dernier, Esq.; Gibson & Dernier LLP

(57) ABSTRACT

A data management apparatus includes a storage device operative to store positional information on objects in a data element space, that is created by organizing a plurality of data elements into a plurality of categories, assigning a subspace to each of the plurality of categories, placing a plurality of subspaces in a multidimensional space, and distributing, in each of the subspaces respectively assigned to the plurality of categories, the objects representing data elements belonging to the associated category; a display unit operative to establish a viewing position and a viewing direction in the data element space, and to generate and display an image of the data element space by referring to the storage device and by rendering the objects located in the data element space; and a control unit operative to acknowledge an instruction for updating the viewing position or viewing direction so as to update them.

13 Claims, 15 Drawing Sheets

(56) References Cited

U.S. PATENT DOCUMENTS

| | | | |
|---|---|---|---|
| 6,016,145 A * | 1/2000 | Horvitz et al. | 715/788 |
| 6,253,218 B1 * | 6/2001 | Aoki et al. | 715/201 |
| 6,281,899 B1 * | 8/2001 | Gould et al. | 715/848 |
| 6,448,987 B1 * | 9/2002 | Easty et al. | 715/834 |
| 6,480,210 B1 * | 11/2002 | Martino et al. | 715/848 |
| 6,556,225 B1 * | 4/2003 | MacPhail | 715/848 |
| 6,628,313 B1 * | 9/2003 | Minakuchi et al. | 715/853 |
| 6,629,097 B1 * | 9/2003 | Keith | 1/1 |
| 6,751,620 B2 * | 6/2004 | Orbanes et al. | 1/1 |
| 6,879,332 B2 * | 4/2005 | Decombe | 715/764 |
| 6,880,132 B2 * | 4/2005 | Uemura | 715/848 |
| 6,961,731 B2 * | 11/2005 | Holbrook | 1/1 |
| 6,968,511 B1 * | 11/2005 | Robertson et al. | 715/835 |
| 7,036,090 B1 * | 4/2006 | Nguyen | 715/834 |
| 7,054,870 B2 * | 5/2006 | Holbrook | 1/1 |
| 7,076,736 B2 * | 7/2006 | Hugh | 715/743 |
| 7,196,705 B2 * | 3/2007 | Gallivan | 345/440 |
| 7,356,777 B2 * | 4/2008 | Borchardt et al. | 715/836 |
| 7,373,612 B2 * | 5/2008 | Risch et al. | 715/850 |
| 7,590,948 B2 * | 9/2009 | Narita et al. | 715/810 |
| 7,603,628 B2 * | 10/2009 | Park et al. | 715/764 |
| 7,689,525 B2 * | 3/2010 | Drucker et al. | 706/45 |
| 7,712,049 B2 * | 5/2010 | Williams et al. | 715/834 |
| 7,730,414 B2 * | 6/2010 | Najdenovski | 715/765 |
| 7,730,425 B2 * | 6/2010 | de los Reyes et al. | 715/835 |
| 7,769,745 B2 * | 8/2010 | Naaman et al. | 707/713 |
| 7,802,205 B2 * | 9/2010 | Bedingfield | 715/848 |
| 7,831,928 B1 * | 11/2010 | Rose et al. | 715/810 |
| 7,958,451 B2 * | 6/2011 | Ishida et al. | 715/738 |
| 7,979,879 B2 * | 7/2011 | Kazama et al. | 725/41 |
| 8,381,122 B2 * | 2/2013 | Louch et al. | 715/784 |
| 2002/0069215 A1 * | 6/2002 | Orbanes et al. | 707/500 |
| 2002/0075331 A1 * | 6/2002 | Orbanes et al. | 345/854 |
| 2003/0160817 A1 * | 8/2003 | Ishida et al. | 345/738 |
| 2004/0141003 A1 * | 7/2004 | Nivers et al. | 345/745 |
| 2004/0150675 A1 * | 8/2004 | Chen et al. | 345/854 |
| 2005/0097603 A1 * | 5/2005 | Kikinis | 725/44 |
| 2005/0138570 A1 * | 6/2005 | Good et al. | 715/789 |
| 2005/0210410 A1 * | 9/2005 | Ohwa et al. | 715/821 |
| 2006/0020888 A1 * | 1/2006 | Kang et al. | 715/708 |
| 2006/0202994 A1 * | 9/2006 | Chevallier et al. | 345/440 |
| 2007/0033220 A1 * | 2/2007 | Drucker et al. | 707/103 R |
| 2007/0106949 A1 * | 5/2007 | Narita et al. | 715/757 |
| 2007/0107015 A1 * | 5/2007 | Kazama et al. | 725/58 |
| 2007/0109297 A1 * | 5/2007 | Borchardt et al. | 345/419 |
| 2007/0133906 A1 * | 6/2007 | Ishida et al. | 382/305 |
| 2007/0204227 A1 * | 8/2007 | Kretz | 715/727 |
| 2008/0016472 A1 * | 1/2008 | Rohlf et al. | 715/848 |
| 2008/0148175 A1 * | 6/2008 | Naaman et al. | 715/781 |
| 2008/0270946 A1 * | 10/2008 | Risch et al. | 715/848 |
| 2009/0083670 A1 * | 3/2009 | Roos | 715/850 |

FOREIGN PATENT DOCUMENTS

| | | |
|---|---|---|
| JP | 2003323454 A | 11/2003 |
| JP | 2004259040 A | 9/2004 |

OTHER PUBLICATIONS

Office Action for corresponding JP Patent Application No. 2007-274276, dated Sep. 18, 2012.

* cited by examiner

FIG.2

| | 71 | 72 | 73 | 74 | 75 | 76 | 77 | 78 | | 79 | 80 |
|---|---|---|---|---|---|---|---|---|---|---|---|
| | FILE ID | FILE NAME | FILE TYPE | FILE SIZE | MULTI-PERSON | SONG | DANCE | BALL GAME | ... | LOCAL COORDINATE | GLOBAL COORDINATE |
| | | | | | {——————————— 70 ———————————} | | | | | | |
| | 0001 | abc.mp3 | MUSIC | 330kb | 85 | 65 | 36 | 5 | ... | (52, 40, 68) | (-30, 308, 178) |
| | 0002 | def.mpg | MOVIE | 945kb | 0 | 12 | 70 | 24 | ... | (96, 11, 34) | (213, 165, 52) |
| | ... | ... | ... | ... | ... | ... | ... | ... | ... | ... | ... |

| CATEGORY ID | CATEGORY NAME | MULTI-PERSON | SONG | DANCE | BALL GAME | ... | SUBSPACE RADIUS | SUBSPACE CENTER COORDINATE |
|---|---|---|---|---|---|---|---|---|
| 0001 | MUSIC | 85 | 65 | 36 | 5 | .. | 80 | (-82, 268, 110) |
| 0002 | MOVIE | 0 | 12 | 70 | 24 | .. | 90 | (117, 154, 18) |
| .. | .. | .. | .. | .. | .. | .. | .. | .. |

FIG.4

| GUIDE ID 91 | GUIDE NAME 92 | CATEGORY 93 | LOCAL COORDINATE 94 | GLOBAL COORDINATE 95 |
|---|---|---|---|---|
| 0001 | JAPANESE BALLAD | MUSIC | (−8, 24, 77) | (−90, 292, 187) |
| 0002 | WAR | MOVIE | (67, 45, −11) | (184, 199, 7) |
| .. | .. | .. | .. | .. |

64

DATA MANAGEMENT APPARATUS AND METHOD FOR ORGANIZING DATA ELEMENTS INTO MULTIPLE CATEGORIES FOR DISPLAY

BACKGROUND OF THE INVENTION

1. Field of the Invention

The present invention relates to data management technologies and, more particularly, to a data management apparatus and method capable of managing a large number of data elements efficiently.

2. Description of the Related Art

As Internet access is available to more and more people, it has become possible for users to access a huge amount of content stored in web servers all over the world. With the increase in the capacity of storage devices, it has also become possible to store a huge amount of content in personal computers owned by individuals.

Thus, a huge amount of content can now be accessed casually so that user convenience has improved dramatically. Meanwhile, this has created a problem of how one can organize and use a huge amount of content.

SUMMARY OF THE INVENTION

In this background, a general purpose of the present invention is to provide a more convenient data management technology.

One aspect of the present invention relates to a data management apparatus. A data management apparatus comprises: a storage device operative to store positional information on objects in a data element space, the data element space being created by organizing a plurality of data elements into a plurality of categories, assigning a subspace to each of the plurality of categories, placing a plurality of subspaces in a multidimensional space, and distributing, in each of the subspaces respectively assigned to the plurality of categories, objects representing data elements belonging to the associated category; a display unit operative to establish a viewing position and a viewing direction in the data element space, and to generate and display an image of the data element space by referring to the storage device and by rendering the objects located in the data element space; and a control operative to acknowledge an instruction for updating the viewing position or viewing direction so as to update the viewing position or viewing direction.

Another aspect of the present invention relates to a data management apparatus. A data management apparatus comprises: a categorizer operative to organize a plurality of data elements into a plurality of categories; a subspace placement unit operative to assign a subspace to each of the plurality of categories and to place a plurality of subspaces in a multidimensional space comprising the data elements; and a subspace generating unit distributing, in each of the subspaces respectively assigned to the plurality of categories, objects representing data elements belonging to the associated category.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows exemplary data in the file database;
FIG. 3 shows exemplary data in the category database;
FIG. 4 shows exemplary data in the guide database.

DETAILED DESCRIPTION OF THE INVENTION

The invention will now be described by reference to the preferred embodiments. This does not intend to limit the scope of the present invention, but to exemplify the invention.

The data management apparatus according to the embodiment provides a graphical user interface that displays data files containing a large amount of contents stored in a storage device in a visually easy-to-understand manner and acknowledges user operations. The data management apparatus places objects representing data files in a multidimensional space (hereinafter, referred to as a content space) virtually built in the data management apparatus. Users can move in the content space at will by controlling the viewing position and viewing direction so as to gain an overview of the entire contents or search for desired contents. According to the embodiment, objects representing contents are placed in a three-dimensional space, by way of example.

The data management apparatus categorizes a large number of data files into a plurality of categories and assign a subspace in the content space to each category. Placement of objects representing data files in a subspace of each category is determined according to the attribute of data files belonging to that category. If we view the entirety of a content space as the space, each subspace represents a galaxy and a data file object represents a star. Users can cruise the content space dispersed with data file objects as if traveling in the space in a spaceship.

Figure 1:
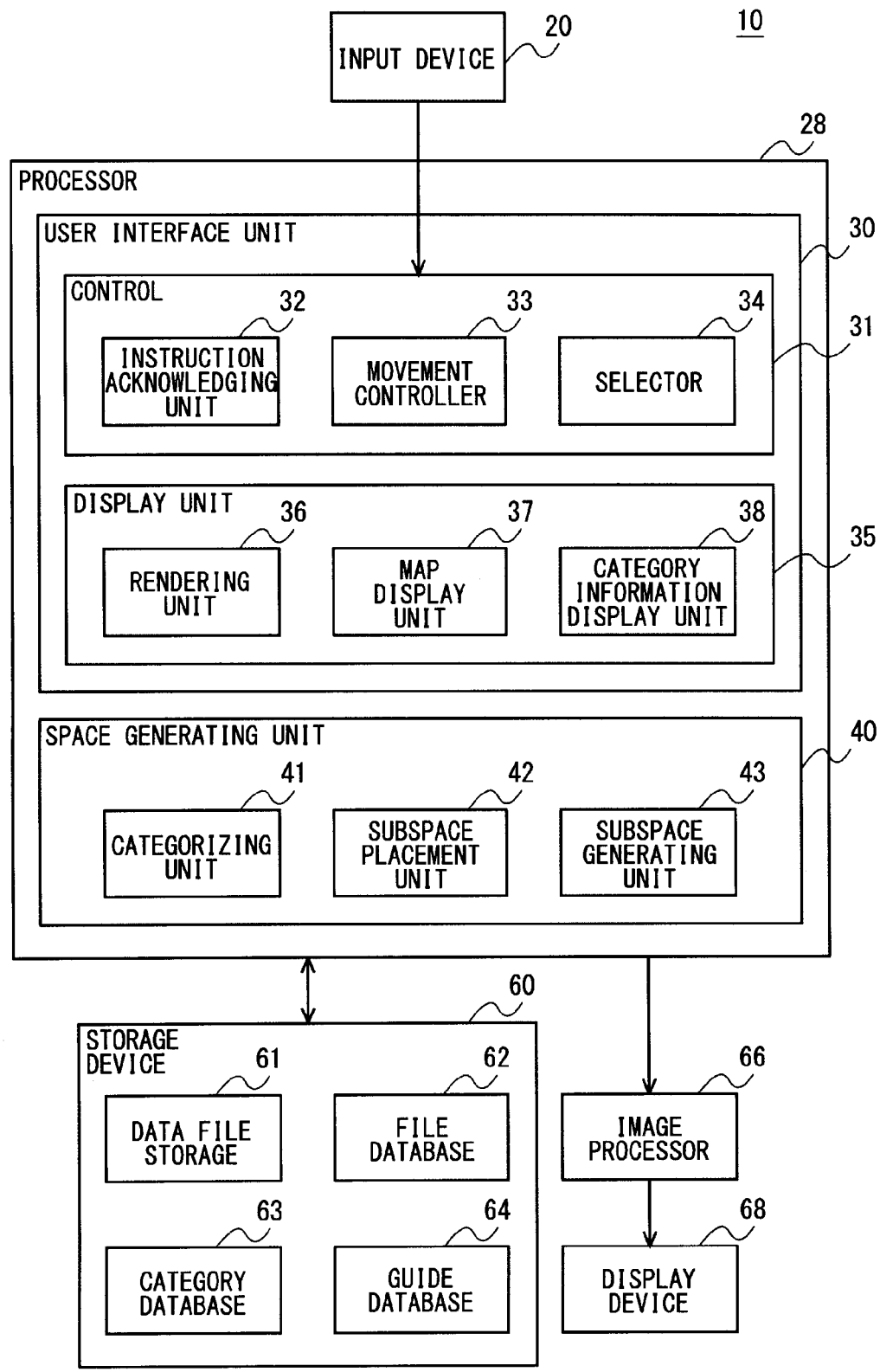
FIG. 1 shows the structure of the data management apparatus according to the embodiment.

FIG. 1 shows the structure of the data management apparatus according to the embodiment. The data management apparatus 10 is provided with an input device 20 such as a mouse, a processor 28, a storage device 60, an image processor 66, and a display device 68. The configuration is implemented, in hardware components, by any CPU of a computer, a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination thereof.

The processor 28 includes a space generating unit 40 for generating a three-dimensional space in which are placed data file objects, and a user interface unit 30 that displays the three-dimensional space thus generated and acknowledges instructions for user control provided via the input device 20. The user interface unit 30 includes a display unit 35 that establishes a viewing position and a viewing direction in the three-dimensional space, and generates and displays an image of the content space by rendering data file objects located in the three-dimensional space, and a control 31 that acknowledges instructions for user control so as to update the viewing position or the viewing direction. The image processor 66 displays a user interface screen generated by the display unit 35 on the display device 68.

The storage device 60 includes a data file storage 61, a file database 62, a category database 63, and a guide database 64. The data file storage 61 stores data files of various contents such as still images, moving images, audio, documents, etc. The data file storage 61 may be implemented by a storage device such as a hard disk drive (HDD), ROM, and RAM, or a removable recording medium such as a CD, DVD, and MD. The file database 62 stores information related to the data files stored in the data file storage 61. The category database 63 stores information on categories according to which the data files are organized. The guide database 64 stores information on guides placed in subspaces assigned to respective categories. Guides are placed to ensure that the type, characteristic, and location of contents placed in the subspaces are known in a visually easy-to-understand manner.

FIG. 2 shows exemplary data in the file database 62. The file database 62 is provided with a file ID field 71, a file name field 72, a file type field 73, a file size field 74, attribute score fields 70, a local coordinate field 79, and a global coordinate field 80. The file ID field 71 stores an ID uniquely identifying a data file. The file name field 72 stores the name of a data file. The file type field 73 stores the type of a data file. The file size field 74 stores the data size of a data file. The attribute score fields 70 store meta data representing attributes of a data file. The attribute score fields 70 include a multiperson field 75, a song field 76, a dance field 77, a ball game field 78, etc. The fields store numerical values yielded by evaluating the contents in the respective viewpoints. Attribute scores may be acknowledged from the user or an attribute score assigning unit (not shown) may assign the values automatically. In the latter case, the attribute score assigning unit analyzes each data file from various perspectives using a known technology to yield a numerical value. The local coordinate field 79 stores the local coordinate of a data file object in a subspace for the associated category, as described later. The global coordinate field 80 stores the global coordinate of a data file object in the entirety of the content space.

FIG. 3 shows exemplary data in the category database 63. The category database 63 includes a category ID field 81, a category name field 82, attribute score fields 83, a subspace radius field 89, a subspace center coordinate field 90. The category field 81 stores an ID uniquely identifying a category. The category name field 82 stores the name of a category. The attribute score fields 83 store meta data representing the attribute of a category. The attribute score fields 83 include fields for storing scores for the same attributes as maintained in the file database 62, including a multiperson field 85, a song field 86, a dance field 87, and a ball game field 88. The subspace radius field 89 stores the radius of subspace assigned to a category. The subspace center coordinate field 90 stores the global coordinate of the center of subspace assigned to a category.

FIG. 4 shows exemplary data in the guide database 64. The guide database 64 is provided with a guide ID field 91, a guide name field 92, a category field 93, a local coordinate field 94, and a global coordinate field 95. The guide ID field 91 stores an ID uniquely identifying a guide. The guide name field 92 stores the name of a guide. The category field 93 stores a category to which a guide belongs. The local coordinate field 94 stores the local coordinate of a guide in a subspace of a category. The global coordinate field 95 stores the global coordinate of a guide in the entirety of content space.

The space generating unit 40 includes a categorizing unit 41, a subspace placement unit 42, and a subspace generating unit 43. The categorizing unit 41 refers to the file database 62 so as to organize the data files stored in the data file storage 61 into a plurality of categories based upon the attribute scores of the data files. Of the attributes maintained in the file database 62, the categorizing unit 41 may categorize the data files according to the file type stored in the file type filed 73. Alternatively, the categorizing unit 41 may categorize the data files according to the attribute score maintained in the attribute score fields 70 of the file database 62. For example, by categorizing the data files according to the attribute score automatically assigned by the attribute score assigning unit, files may be organized into unexpected categories the user were not aware of. The categorizing unit 41 may acknowledge the designation of attribute score to be used for categorization. Alternatively, the unit 41 may switch the method of categorization according to a user instruction. Once the categorization of data files is completed, the categorizing unit 41 stores the categorized files in the file database 62.

The subspace placement unit 42 assigns subspaces in the content space to the categories resulting from the categorization by the categorizing unit 41 and places the subspaces in the content space. The subspace placement unit 42 defines an attractive force and a repulsive force exerted between the subspaces according to the similarity between attribute scores of a plurality of categories and places the subspaces in the content space based upon the attractive force and the repulsive force. The similarity between categories may be determined according to the co-occurrence relation obtained by statistically processing the attribute scores of the data files belonging to the categories.

The subspace placement unit 42 computes a meta data vector of the categories by using the attribute scores of the data files belonging to the categories. Given that an attribute score $p(i,k)$ related to an attribute k of a category i is such that $p(i,k)$=(the number of data files belonging to the category i and assigned a score for an attribute k equal to or greater than a predetermined value)/(the total number of data files belonging to the category i), The meta data vector $q(i)$ of the category i is given by $$q(i)=(p(i,1),p(i,2),\ldots,p(i,n))$$

where n denotes the total number of attributes.

The similarity between the category i and the category j is given by a scalar product of $q(i)$ and $q(j)$.

The subspace placement unit 42 ensures that the larger the similarity between categories thus computed, the stronger the attractive force between the subspaces of the categories. The subspace placement unit 42 also ensures that, if the similarity between categories is small and if the distance between the subspaces of the categories is small, a repulsive force is exerted between the subspaces. The subspace placement unit 42 applies an attractive force model, in which is introduced an attractive force or a repulsive force exerted between the subspaces, to the center coordinates of the subspaces and determines the coordinates by a convergent calculation. The subspace placement unit 42 determines the initial position of the subspaces, updates the center coordinates of the subspaces according to the attractive forces or the repulsive forces exerted between the subspaces, and computes positions at which the forces are in balance. The subspace placement unit 42 stores the center coordinates of the subspaces thus determined in the category database 63.

For each of the categories, the subspace generating unit 43 distributes objects representing the data files belonging to the category in a subspace assigned to the category. The subspace generating unit 43 distributes objects in a subspace based upon the attribute scores of data elements. For example, the subspace generating unit 43 may employ three of attribute scores maintained in the attribute score fields 70 of the file database 62 and distribute data file objects in a subspace with reference to the employed attribute scores. Alternatively, data file objects may be distributed in a subspace by multivariate analysis employing a plurality of attribute scores as characteristic information. In the latter case, the technology described in JP 2006-268551 can be employed. The subspace generating unit 43 may define an attractive force or a repulsive force exerted between objects according to the similarity between attribute scores of data files and place objects in a subspace based upon the attractive force or the repulsive force. In either case, the subspace generating unit 43 may base the distribution of data file objects in a subspace upon different attributes for at least two categories. The subspace generating unit 43 stores the coordinates of data file objects thus computed in the file database 62.

For each of the plurality of categories, the subspace generating unit 43 further distributes, in the subspace assigned to the category, guides indicating the positions of data files belonging to the category and having specific characteristics. The subspace generating unit 43 may categorize the data files belonging to the category into a plurality of types, assign guides to the respective types, and distribute the guides in the subspace. For example, guides such as "Japanese ballad", "classical", "tango" may be placed in the subspace of the category "music". In this case, the subspace generating unit 43 assigns an attribute score typical of data files categorized into "Japanese ballad" to the guide for "Japanese ballad" so as to place the guide at a position defined by the attribute score. Alternatively, the unit 43 may read the coordinates of the data files categorized into "Japanese ballad" from the file database 62 so as to compute the position of the guide for "Japanese ballad" based upon the coordinates. In the latter case, the center of gravity may be computed from the coordinates of the data files categorized into "Japanese ballad" and place the guide for "Japanese ballad" at the position thus computed. The subspace generating unit 43 stores the coordinate of the guide thus computed in the guide database 64.

Figure 5:
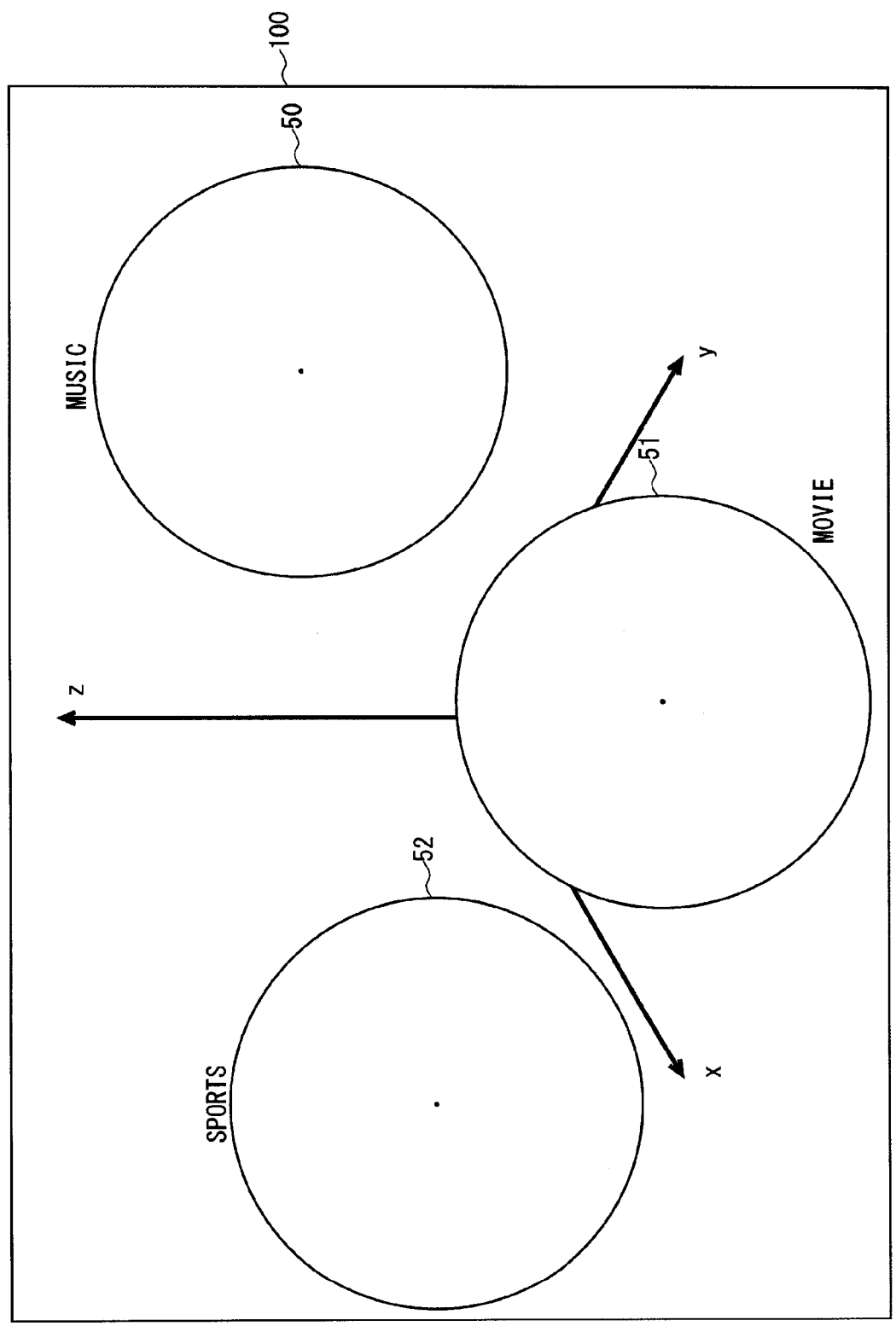
FIG. 5 shows an exemplary content space.

FIG. 5 shows an exemplary content space 100. In the illustrated example, the categorizing unit 41 categorizes the data files into three categories, namely "music", "movie", and "sports". The subspace placement unit 42 assigns subspaces 50, 51, and 52 to the three categories and places the subspaces at predetermined initial positions in the content space. The radius of the subspaces may be determined according to the number of data files belonging to the category or the file size thereof. The subspace may not necessarily be spherical but may be a polygon or a three-dimensional object having an arbitrary shape.

Figure 6:
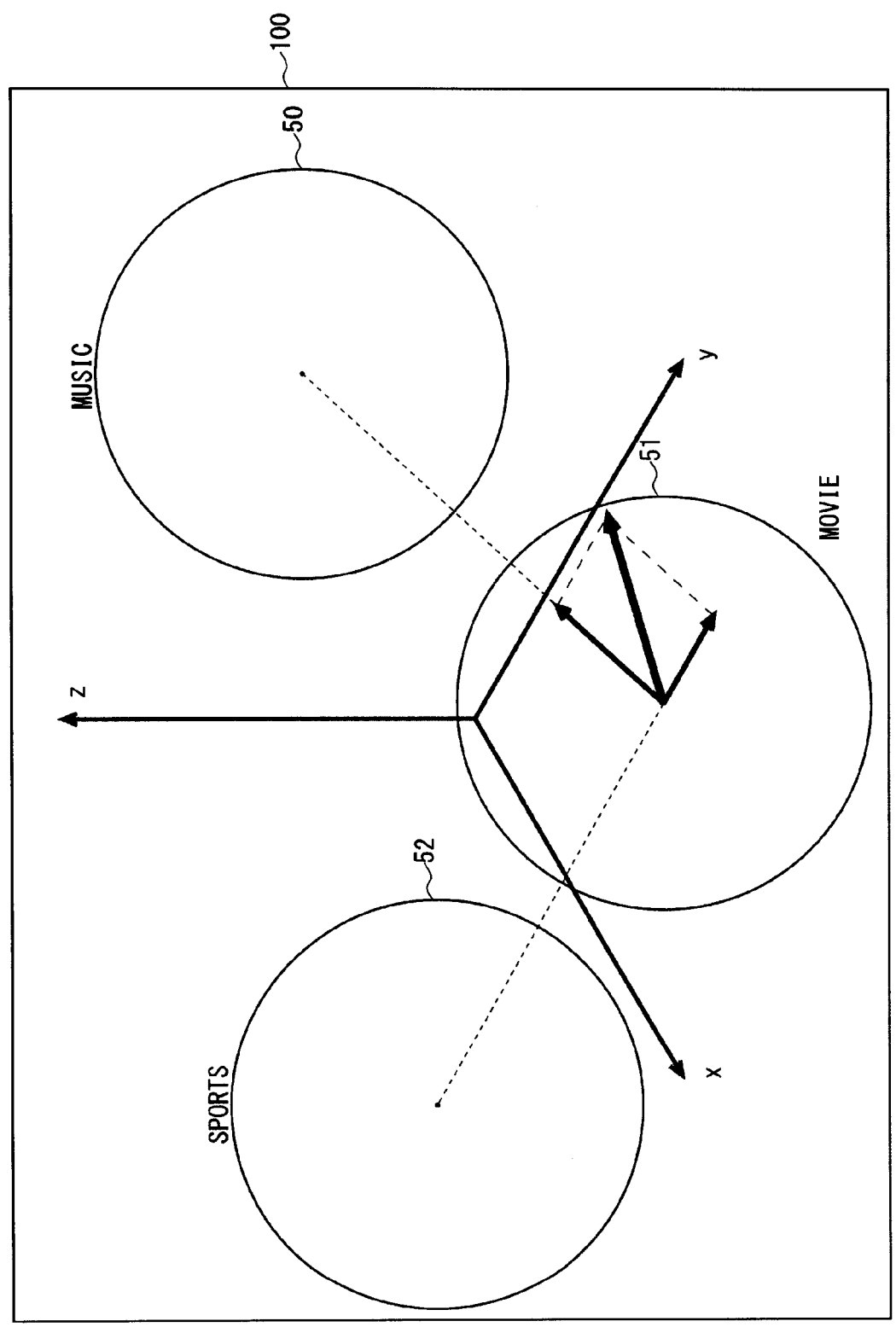
FIG. 6 shows how attractive forces and repulsive forces are exerted between the subspaces.

FIG. 6 shows how attractive forces and repulsive forces are exerted between the subspaces. The subspace placement unit 42 defines an attractive force or a repulsive force exerted between the subspaces according to the similarity between attribute scores of categories. For example, the force exerted on the subspace 51 for the category "movie" is a sum of the attractive force exerted between the subspace 51 and the subspace 50 for the category "music" and the repulsive force exerted between the subspace 51 and the subspace 52 for the category "sports". The number of data files belonging to the category, file size, and attribute score may further be referred to so as to define an attractive force or a repulsive force exerted between subspaces.

Figure 7:
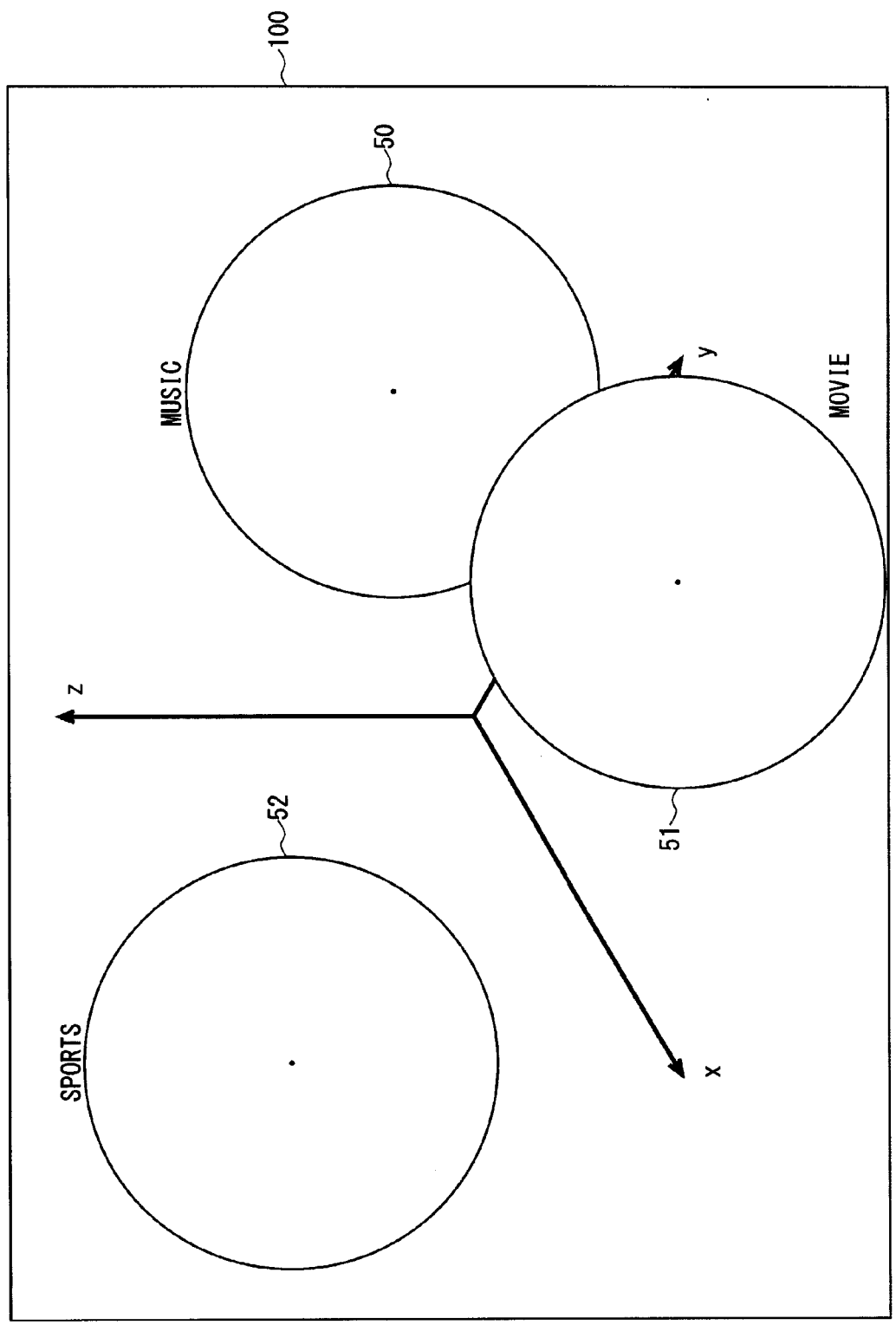
FIG. 7 shows an exemplary result obtained by performing convergent calculation according to the attractive force model.

FIG. 7 shows an exemplary result obtained by performing convergent calculation according to the attractive force model. The subspace 50 of the category "music", the subspace 51 of the category "movie", and the subspace 52 of the category "sports" are placed at positions where the forces exerted therebetween are in balance. By representing the closeness or distance in meaning between categories as closeness or distance in space, a user interface that is easy to understand visually is provided. By placing categories having opposite meanings to be symmetrical about the origin in the space, the polarity in meaning is represented by the opposite positions in space. Accordingly, a user interface that is easy to understand visually results.

Figure 8:
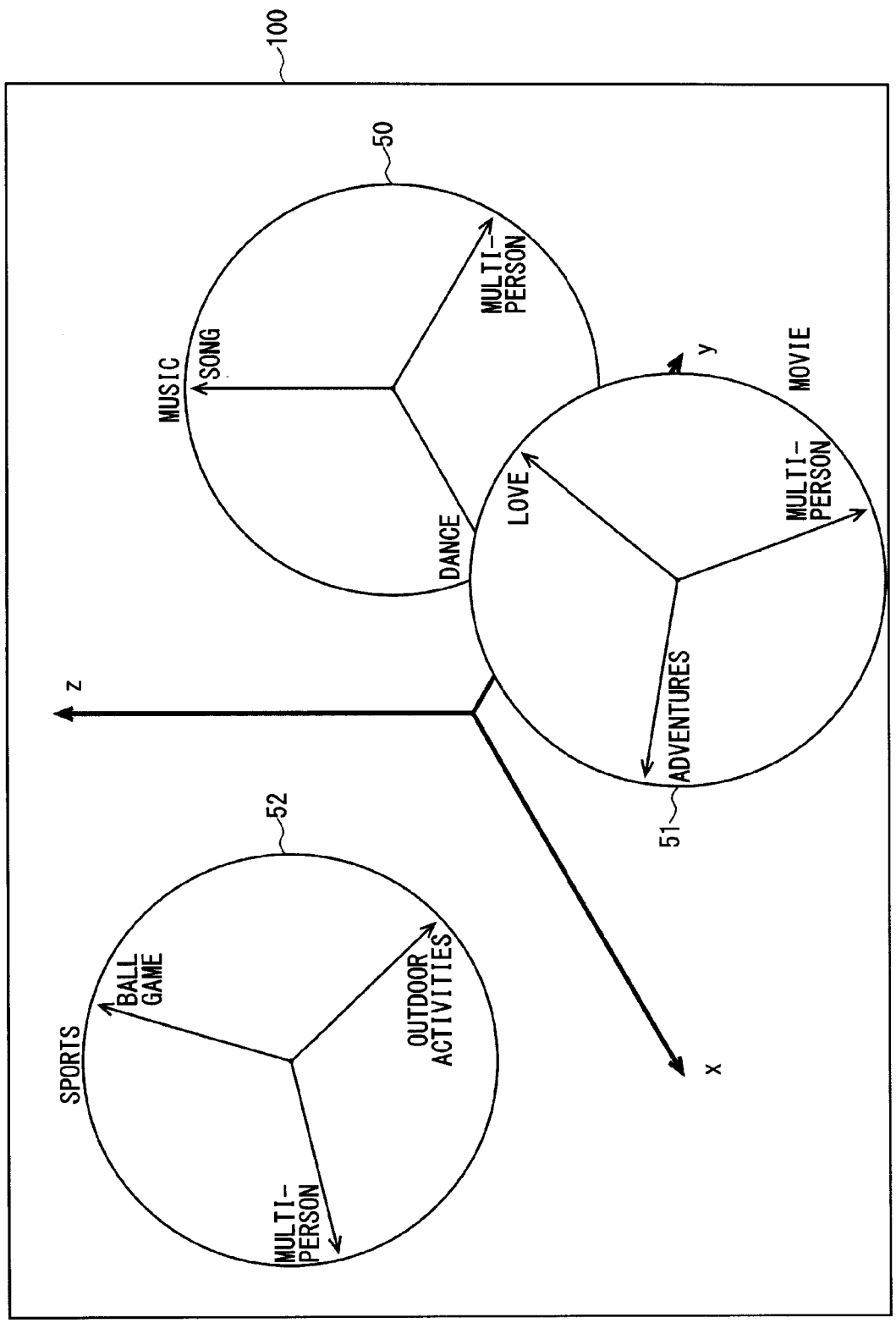
FIG. 8 shows how axes for distributing data file objects in the respect subspaces are established.

FIG. 8 shows how axes for distributing data file objects in the respect subspaces are established. For example, axes representing three attributes, namely "song", "dance" and "multiperson" are established in the category "music" so that data file objects are distributed with reference thereto. In the category "movie", axes representing three attributes "love", "adventure", and "multiperson" are established so that data file objects are distributed accordingly. Thus, the embodiment allows data file objects to be distributed with reference to attributes different from category to category. Therefore, data file objects can be distributed by employing attributes most suitable for the category so that a user interface that is easy to understand visually is provided. Since the subspaces are not isolated but are integrated into a single content space, the user can get an overview of a plurality of categories or move to subspaces of different categories seamlessly.

Figure 9:
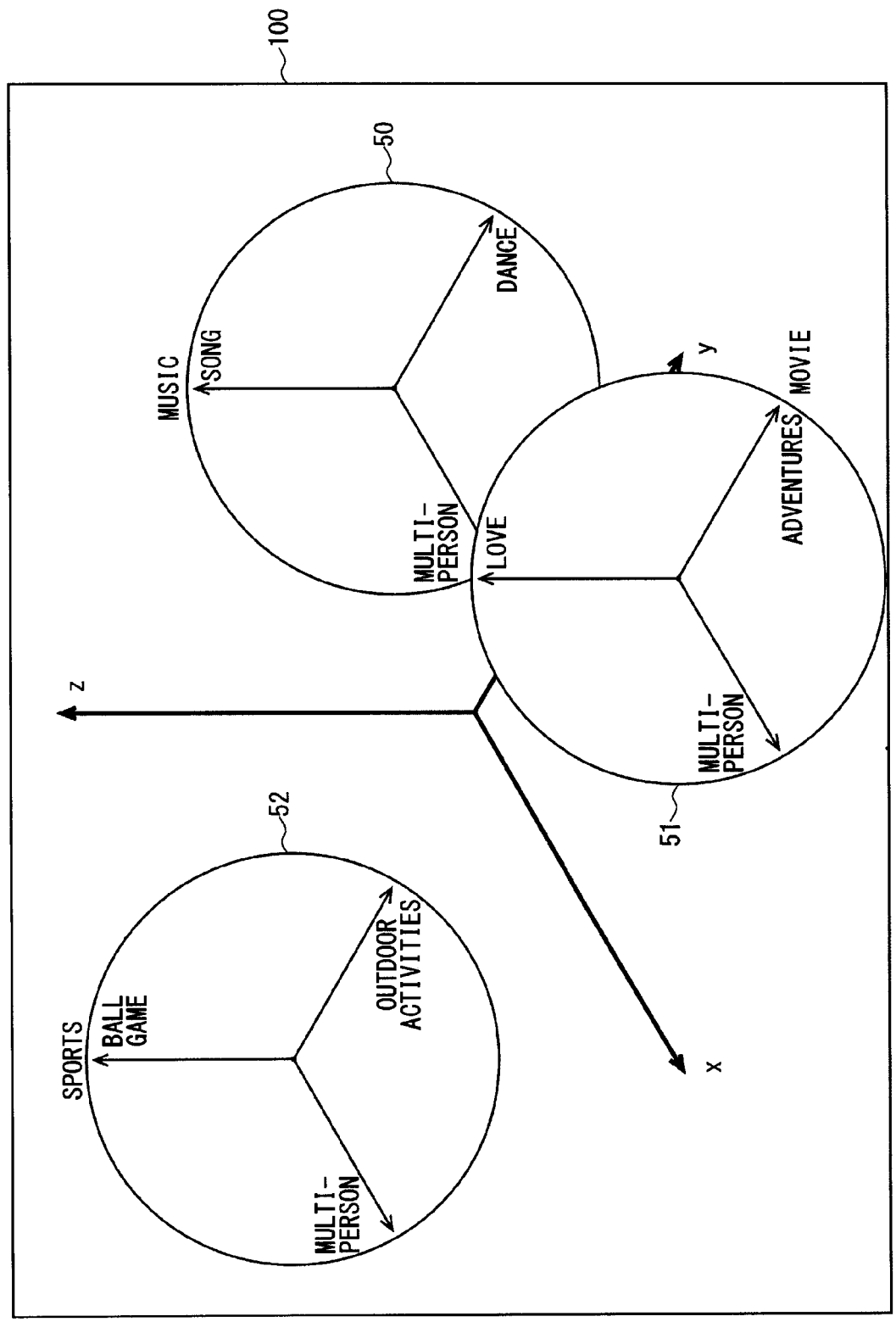
FIG. 9 shows how the subspaces are rotated according to the relation between distributions of objects in the respective subspaces.

FIG. 9 shows how the subspaces are rotated according to the relation between distributions of objects in the respective subspaces. In the example shown in FIG. 8, the attribute "multiperson", which is common to the category "music", the "movie" category, and the category "sports", is established as an axis for distribution of data file objects. Therefore, the subspaces of FIG. 9 are rotated so that the axis for the attribute "multiperson" is identically located in the categories. This will facilitate the understanding of data file distribution even when the user moves across different categories. The size or shape of a subspace may be modified according to the distribution of objects in the subspace.

Figure 10:
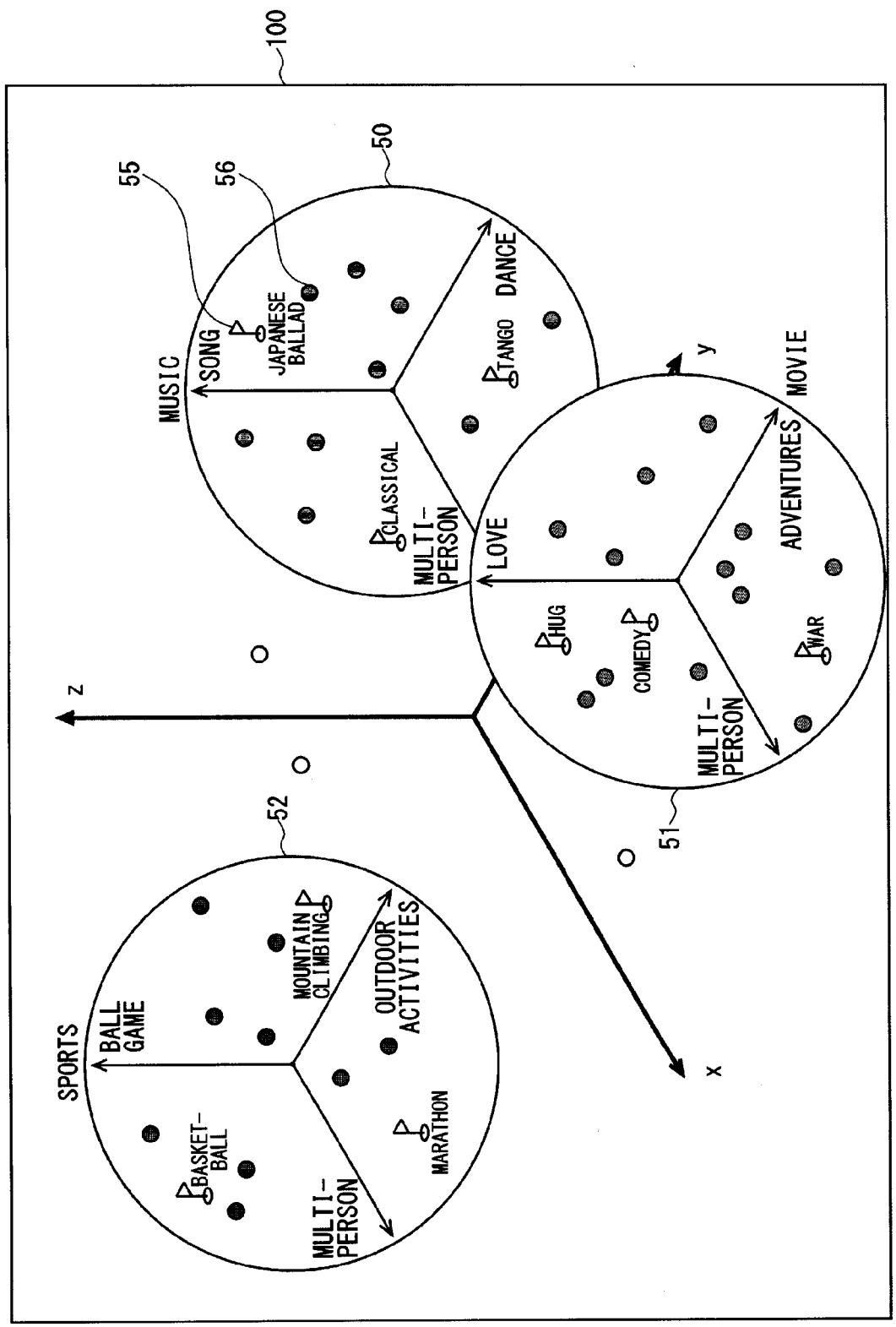
FIG. 10 shows how data file objects and guides are placed in the subspaces.

FIG. 10 shows how data file objects and guides are placed in the subspaces. In each subspace, data file objects 56 and guides 55 are placed. For example, in the category "sports", the guide "basketball" is placed where the attribute score for the attribute "ball game" and the attribute score for the attribute "multiperson" are both high, indicating that data files having high relevance to "basketball" are placed around the guide. The objects 56 and the guides 55 may be displayed by rendering three-dimensional form data or displayed as textures or thumbnail images.

Data files belonging to a plurality of categories or data files relevant to a plurality of categories may be placed between the subspaces of the categories. In this way, relevance to a plurality of categories can be represented spatially, resulting in a user interface that is easy to understand visually. Data files may be distributed such that, the closer to the center of the subspace of a category a data file is placed, the greater the relevance of the data file to the category. In this way, the closeness or distance in meaning of a data file can be represented by the closeness or distance in a space. By placing the subspaces of a plurality of categories to overlap each other partially, the part common to the categories may be represented as such.

Figure 11:
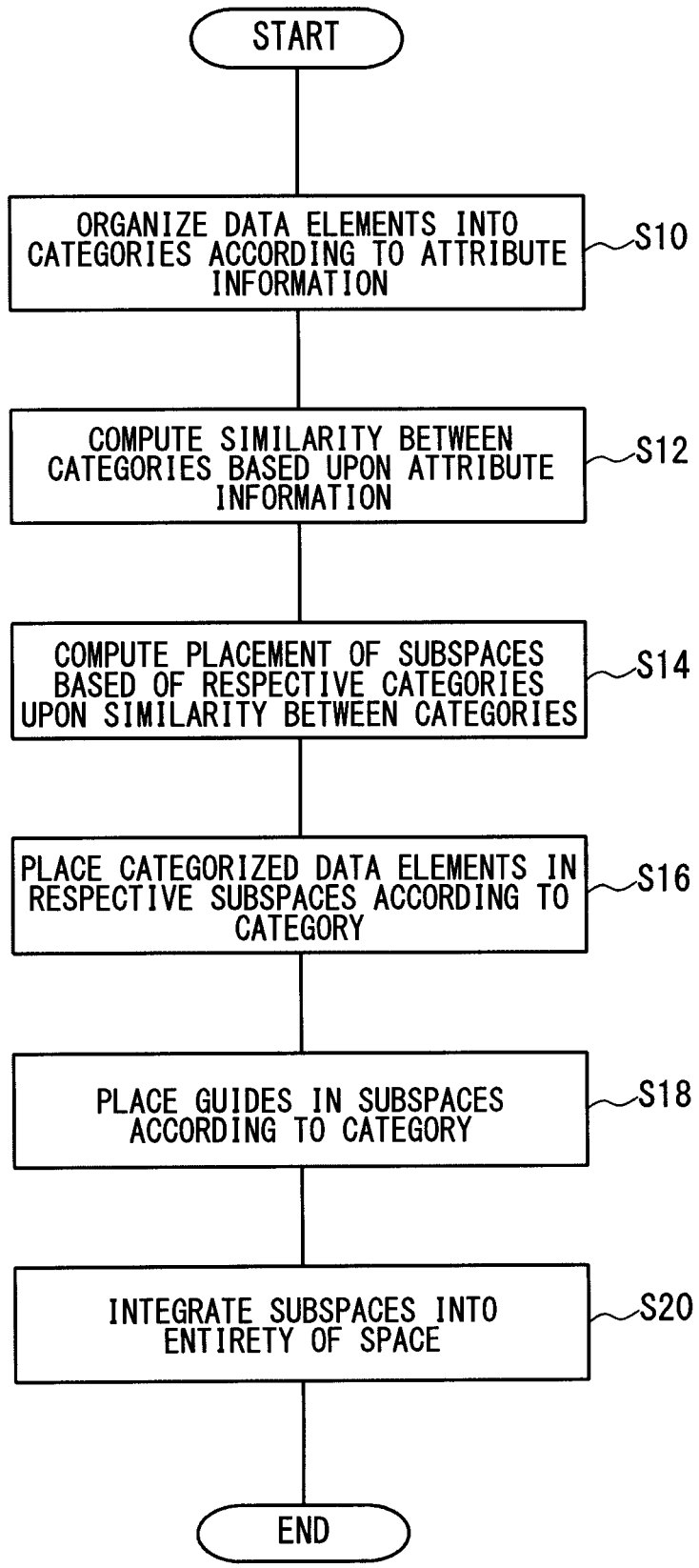
FIG. 11 is a flowchart showing the steps in a method for generating a content space.

FIG. 11 is a flowchart showing the steps in a method for generating a content space. The categorizing unit 41 organizes data files into categories according to the attribute scores of the data files (S10). The subspace placement unit 42 computes the similarity between the categories based upon the attribute scores of the data files belonging to the categories (S12) and computes the placement of the subspaces of the respective categories based upon the similarity between the categories (S14). The subspace generating unit 43 places the categorized data files in the respective subspaces according to the category (S16) and places guides in the subspaces according to the category (S18). The subspace generating unit 43 computes the global coordinates in the content space from the local coordinates of the data file objects and the guides, and records the coordinates thus computed n the file database 62 and the guide database 64. In this way, the subspaces are integrated into the entirety of the content space (S20).

A description will now be given of the technology for displaying the content space thus generated and allowing navigation through the content space by updating the viewing position and viewing direction by a user instruction.

The display unit 35 generates an image of the content space and displays the image on the display device 68 by establishing a viewing position and viewing direction in the content space thus generated and rendering objects located in the content space accordingly. The display unit 35 includes a rendering unit 36, a map display unit 37, and a category information display unit 38.

The rendering unit 36 renders a content space. The map display unit 37 displays a map representing the entirety of the content space. The category information display unit 38 displays information on the category assigned the subspace to which the viewing position belongs or the subspace close to the viewing position.

The control 31 acknowledges an instruction for updating the viewing position or viewing direction via the input device 20, updates the viewing position or viewing direction, and notifies the display unit 35 accordingly. The control 31 includes an instruction acknowledging unit 32, a movement controller 33, and a selector 34.

The instruction acknowledging unit 32 acknowledges an instruction for control from the input device 20. The movement controller 33 moves the viewing position or viewing direction continuously in accordance with the instruction for updating the viewing position or viewing direction acknowledged by the instruction acknowledging unit 32. Since the subspaces are integrated into the content space as described above, the movement controller 33 is capable of moving the viewing position from a subspace to which the viewing position belongs to the adjacent subspace continuously. When the movement controller 33 moves the viewing position to a subspace of a different category, the display unit 35 may display the movement in an identifiable manner by displaying a visual effect (e.g., entry in the earth's atmosphere) or changing the display color. The movement controller 33 is also operative to change the angle of field in accordance with an instruction for updating the zoom factor acknowledged by the instruction acknowledging unit 32.

Upon acknowledgement of an instruction for moving the viewing position to a subspace different from the subspace to which the viewing position belongs, the movement controller 33 moves the viewing position to a predetermined position in the destination subspace.

The selector 34 refers to the file database 62 so as to extract objects of data files located within a predetermined distance from the viewing position. The selector 34 acknowledge the user selection of a data file from among the data files associated with the objects thus extracted, in accordance with an instruction acknowledged by the instruction acknowledging unit 32. Once the selection of a data file is finalized, the selector 34 notifies the application processing the selected data file accordingly.

The selector 34 refers to the category database 63 so as to extract subspaces of categories located within a predetermined distance from the viewing position. The selector 34 acknowledges the user selection of a destination category from among the categories associated with the subspaces thus extracted, in accordance with an instruction acknowledged by the instruction acknowledging unit 32. When the selector 34 acknowledges the selection of a destination category, the movement controller 33 moves the viewing position to a predetermined position in the subspace corresponding to the selected category.

The selector 34 refers to the guide database 64 so as to extract guides located within a predetermined distance from the viewing position. The selector 34 acknowledges the user selection of a destination guide from among the guides thus extracted, in accordance with an instruction acknowledged by the instruction acknowledging unit 32. When the selector 34 acknowledges the selection of a destination guide, the movement controller 33 moves the viewing position to a predetermined position in the neighborhood of the selected guide.

Figure 12:
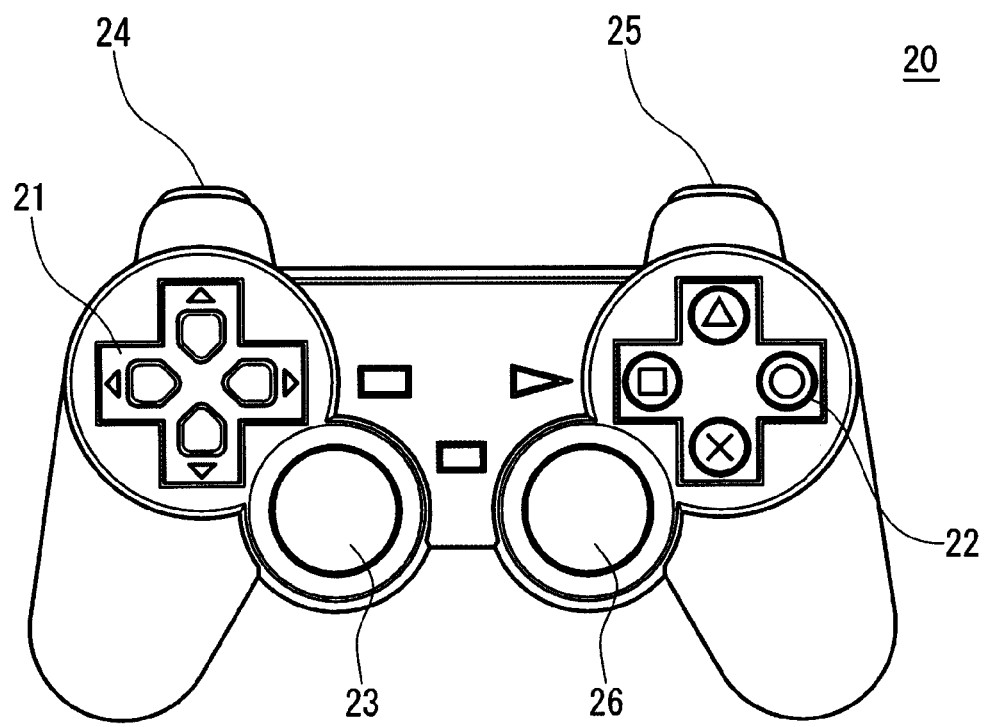
FIG. 12 shows the appearance of the input device.

FIG. 12 shows the appearance of the input device 20. The input device 12 is provided with directional buttons 21, a button 22, analog sticks 23 and 26, a button 24, and a button 25. The user is capable of providing an instruction for updating the viewing position by using the left analog stick 23 and providing an instruction for updating the viewing direction by using the left analog stick 26. The user is also capable of providing an instruction for zooming in by using the left button 24 and providing an instruction for zooming out by using the right button 25. Further, the user is capable of updating the candidate of selection such as a data file, a category, and a guide by using the directional buttons 21 and is also capable of confirming the selection by using the button 22.

Figure 13:
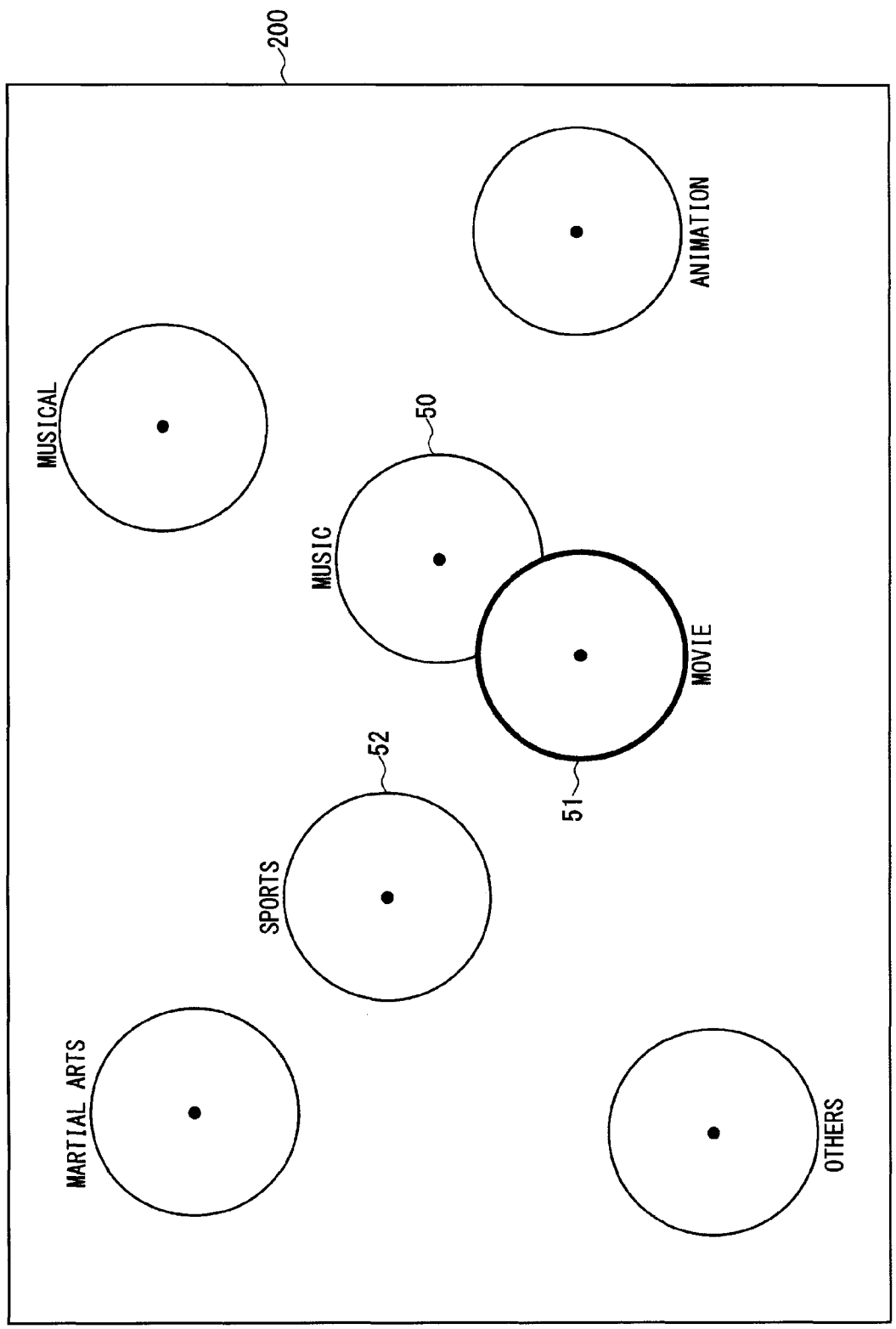
FIG. 13 shows an exemplary screen displayed by the display unit.

FIG. 13 shows an exemplary screen 200 displayed by the display unit 35. In the example shown in FIG. 13, the entirety of content space is displayed and subspaces of categories like "sports" and "music" are displayed. Differences between categories may be expressed in a visually easy-to-understand manner by using different colors to present subspaces. Shades of subspaces may be determined according to the number of data files included in a categories or the distribution of the data files.

Figure 14:
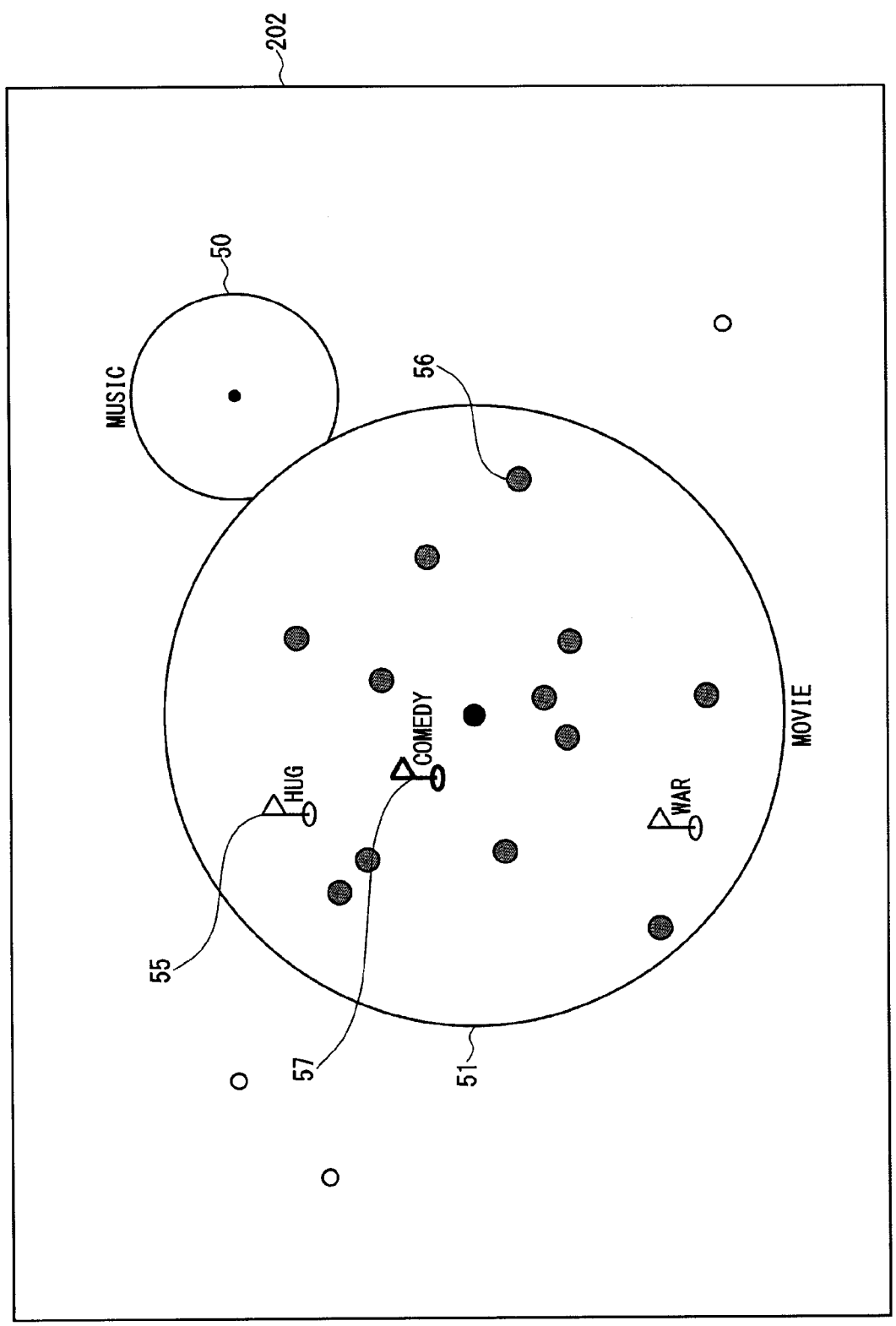
FIG. 14 shows an exemplary screen displayed by the display unit.

FIG. 14 shows an exemplary screen 202 displayed by the display unit 35. As the user uses the button 25 to zoom in in the display screen shown in FIG. 13, the screen shown in FIG. 14 results. In the example shown in FIG. 14, the neighborhood of the category "movie" in the screen of FIG. 13 is highlighted. The names of the categories assigned the respective subspaces in the screen are displayed by the category information display unit 38. In this way, no explicit operation for transition between layers is necessary for transition from a state in which the entirety of content space is displayed to a state in which a subspace of a specific category is displayed. Seamless transition from layer to layer is possible by enlarging or shrinking a screen. Thus, a natural, easy-to-understand control system is provided.

Figure 15:
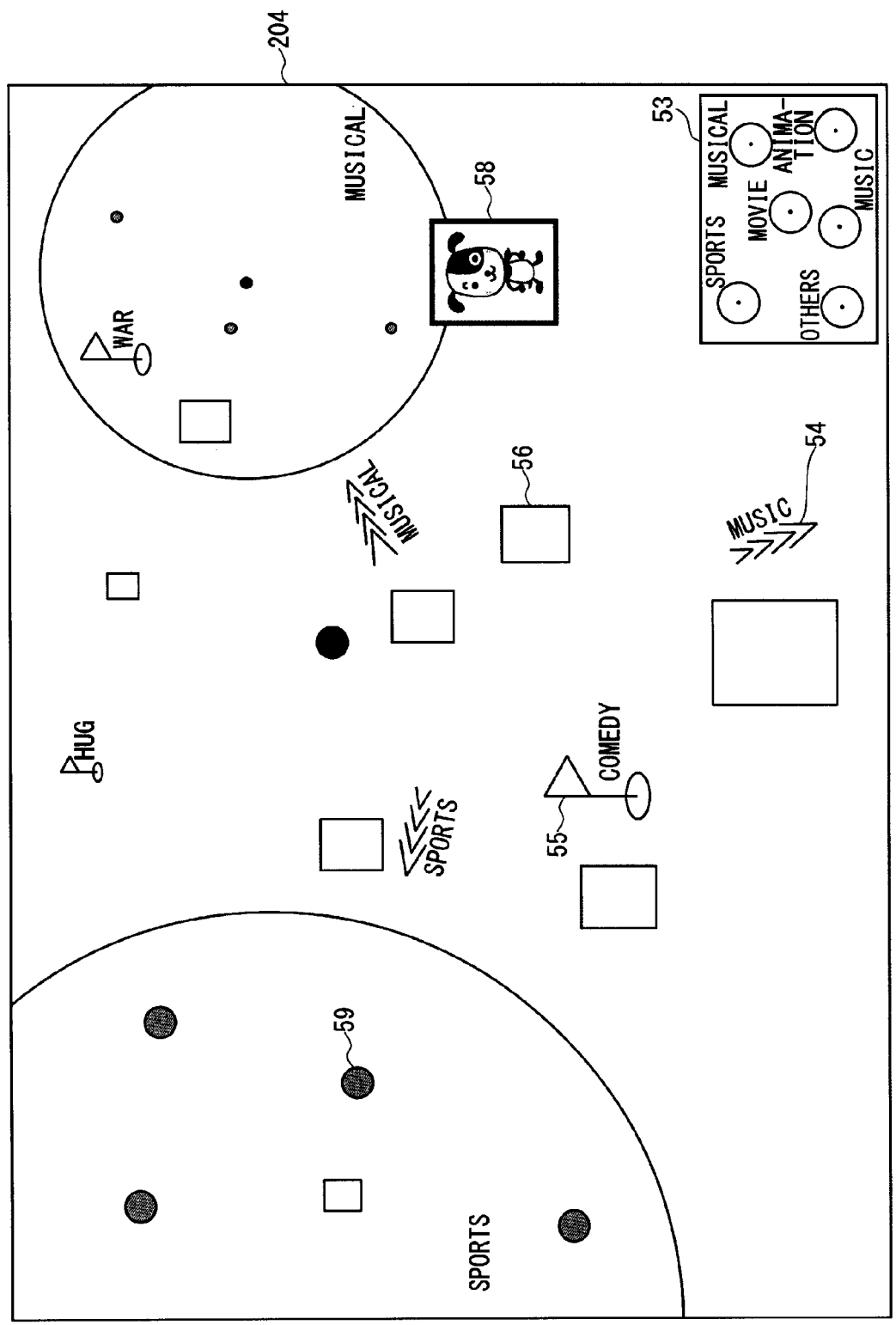
FIG. 15 shows an exemplary screen displayed by the display unit.

FIG. 15 shows an exemplary screen 204 displayed by the display unit 35. In the example of FIG. 15, a more zoomed-in view is presented. The viewing position is moved inside the "movie" category. The screen shows the objects 56 of data files and the guides 55 placed in the subspace of the "movie" category. Subspaces assigned to categories around are also displayed. Data files of a category assigned the subspace to which the viewing position belongs and data files of categories assigned the subspaces around may coexist in the same screen. The display unit 35 may display objects 59 belonging to a subspace different from the subspace to which the viewing position belongs in a display format different from that of the objects 56 belonging to the subspace to which the viewing position belongs. This makes distinction between subspaces is easy to be recognized and improve user convenience. In the example of FIG. 15, thumbnails of associated data files are used as the objects 56 in the subspace to which the viewing position belongs.

The map display unit 37 displays a map of the entirety of content space in a map area 53 in the screen 204. The map may be a reduced view of the content space around the viewing position and lying ahead. Alternatively, the map may be a reduced image of the content space around the viewing position as viewed from above. In other words, the map may be an eye-level view of the content space or a top view thereof. The map displayed in the map area 53 may show the entirety of content space or a part thereof. The map helps the user to recognize the current viewing position and the surrounding situation easily.

The category information display unit 38 displays in the screen 204 an arrow 54 indicating the direction in which a subspace close to the viewing position lies and the category name assigned to the subspace. This helps the user to locate the subspace of the category close to the viewing position easily. By representing the arrow 54 using a combination of a plurality of arrows of different sizes, the position in the direction perpendicular to the screen, i.e., in the front-to-back direction, can be represented accurately.

The rendering unit 36 may change the method for rendering guides and objects depending on the distance from the viewing position. The rendering unit 36 may prepare a plurality of types of form data for guides and objects, including detailed data and coarse data. The rendering unit 36 may render guides and objects remote from the viewing position using coarse form data and those nearby may be rendered using detailed form data. Guides and objects away from the viewing position by a predetermined distance or longer may not be rendered.

In any of the screens shown in FIGS. 13, 14, and 15, the user can change the viewing position, viewing direction, and angle of field by using the input device 20. When the user positions the left analog stick 23 rightward or leftward, the movement controller 33 moves the viewing position right or left. When the user positions the left analog stick 23 upward or downward, the movement controller 33 moves the viewing position forward or backward. When the user uses the right analog stick 26, the movement controller 33 changes the viewing direction as designated. In this way, the user can move through the content space at will, moving the viewing position or viewing direction in a desired direction. In the aforementioned example, one analog stick is used to change the viewing position and another analog stick is used to change the viewing direction. Alternatively, a directional control device such as a single analog stick may be used to change both the viewing position and viewing direction. In this case, the viewing direction may always be aligned with the direction of forward movement of the viewing position. In the aforementioned example, the movement controller 33 moves the viewing position forward or backward as the analog stick 23 is positioned upward or downward. Alternatively, the viewing position may be moved upward or downward. In this case, the control for forward or backward movement may be provided via, for example, another input key. Still alternatively, whether the upward/downward positioning of the analog stick 23 effects forward/backward movement of the viewing position or upward/downward movement thereof may be selected by switching.

In any of the screens shown in FIGS. 13, 14, and 15, the user can select a category, guide, or a data file by using the input device 20. For example, in the screen shown in FIG. 13, the selector 34 extracts subspaces located within a predetermined distance from the viewing position, from among the subspaces of categories currently displayed on the screen, and designates the subspaces thus extracted as candidates for selection, displaying those subspaces in a display format different from that of the subspaces of categories not selectable. The selector 34 acknowledges an instruction for user control from the instruction acknowledging unit 32 so as to switch the category selected, highlighting the subspace of the category currently selected. Upon acknowledging an instruction for confirming the selection from the instruction acknowledging unit 32, the selector 34 notifies the movement controller 33 of the category selected. For example, when the selector 34 acknowledges an instruction for selecting the subspace 51 of the "movie" category in the screen shown in FIG. 13, the movement controller 33 moves the viewing position to a predetermined position (e.g., the center) in the subspace 51 of the "movie" category. In this way, movement to an intermediate layer is omitted and a shift from the screen shown in FIG. 13 to the screen shown in FIG. 15 can take place instantly.

In the screen shown in FIG. 14, the selector 34 extracts guides located within a predetermined distance from the viewing position, from among the guides currently displayed on the screen, and designates the guides thus extracted as being selectable, displaying those guides in a display format different from that of the guides not selectable. The selector 34 acknowledges an instruction for user control from the instruction acknowledging unit 32 so as to switch the guide selected, highlighting the guide currently selected. Upon acknowledging an instruction for confirming the selection from the instruction acknowledging unit 32, the selector 34 notifies the movement controller 33 of the guide selected. For example, when the selector 34 acknowledges an instruction for selecting a "comedy" guide 57 in the "movie" category in the screen shown in FIG. 14, the movement controller 33 moves the viewing position to a predetermined position in the neighborhood of the "comedy" guide. This allows the user to move to the neighborhood of a desired file efficiently and improves user efficiency as a result.

In the screen shown in FIG. 15, the selector 34 extracts data file objects located within a predetermined distance from the viewing position, from among the data file objects currently displayed on the screen, and designates the objects thus extracted as being selectable, displaying those objects in a display format different from that of the data file objects not selectable. The selector 34 acknowledges an instruction for user control from the instruction acknowledging unit 32 so as to switch the data files selected, highlighting data file objects currently selected. Upon acknowledging an instruction for confirming the selection from the instruction acknowledging unit 32, the selector 34 notifies an application or the like of the data file 58 selected. This allows the user to have the application process a desired data file.

The selector 34 may switch the selection by acknowledging an instruction for user control designating whether the category, guide, or data file is to be selected. Alternatively, the selector 34 may automatically switch the selection in accordance with the zoom factor. In the former case, categories, guides, or data files may be made switchably selectable from any of the screens shown in FIGS. 13, 14, and 15. In the latter case, categories may be designated as being selectable in the screen 200 of FIG. 13, which shows the entirety of content space, guides may be designated as being selectable in the screen 202 of FIG. 14, which shows the entirety of a subspace of a category, and data files may be designated as being selectable in the screen 204 of FIG. 15, which shows the interior of a subspace of a category.

The selector 34 may acknowledge user selection of a destination category in the map area 53 displayed by the map display unit 37.

In the above example, data files are organized into categories. Alternatively, data files may be organized into categories in a plurality of layers. In this case, the categorizing unit 41 organizes data files into categories in a plurality of layers. If a given category includes a category lower in the hierarchy, the subspace placement unit 42 places the subspace assigned to the lower category in the subspace of the given category. If a category includes data elements, the subspace generating unit 43 distributes the objects representing the data elements belonging to that category in the subspace assigned to that category. Thus, by integrating subspaces into a single content space even if data files are organized into categories in a plurality of layers, data files can be placed in a visually easy-to-understand manner and seamless transition between categories and layers is possible.

The invention has been described based upon an exemplary embodiment. The embodiment is intended to be illustrative only and it will be obvious to those skilled in the art that various modifications to constituting elements and processes could be developed and that such modifications are also within the scope of the present invention.

What is claimed is:

1. A data management apparatus comprising:
    a storage device operative to store positional information on objects in a data element space, the data element space being created by organizing a plurality of data elements into a plurality of categories, assigning a subspace to each of the plurality of categories, placing a plurality of subspaces in a multidimensional space, and distributing, in each of the subspaces respectively assigned to the plurality of categories, the objects representing data elements belonging to the associated category based upon attribute information of the data elements;
    a display unit operative to establish a viewing position and a viewing direction in the data element space, and to generate and display on a display device an image of the data element space by referring to the storage device and by rendering the objects located in the data element space, wherein: (i) each subspace of each category is defined by a substantially circular perimeter, a substantially central point within the subspace, and a plurality of axes extending from the central point towards the perimeter; (ii) each axis represents a respective attribute of the data elements defined by the attribute information thereof such that the data elements are distributed along the respective axes in accordance with the attributes thereof; (iii) respective axes of the plurality of subspaces having at least similar attributes are oriented in a substantially common angular position about the respective central points of the plurality of subspaces; (iv) respective subspaces having substantially similar attribute information are located closer together than respective subspaces having relatively different attribute information; and (v) only subspaces that are placed in the multidimensional space within a predetermined distance from the viewing position and in the viewing direction by referring to the storage device are displayed and any subspaces beyond the predetermined distance and outside the viewing direction are not displayed; and
    a control unit operative to: (i) acknowledge from an input device an instruction for updating the viewing position or viewing direction so as to update the viewing position or viewing direction.

2. The data management apparatus according to claim 1, wherein the selector is further operative to extract objects within the predetermined distance from the viewing position by referring to the storage device, and to acknowledge user selection from the data elements corresponding to the objects thus extracted.

3. The data management apparatus according to claim 2, wherein the control unit is capable of continuous movement of the viewing position from a subspace to which the viewing position belongs to an adjacent subspace.

4. The data management apparatus according to claim 3, wherein when the control unit moves the viewing position to a different subspace, the display unit displays the movement as such in an identifiable manner.

5. The data management apparatus according to claim 2, wherein
    the storage device further stores positional information on the subspaces in the data element space,
    the selector extracts subspaces within a predetermined distance from the viewing position by referring to the storage device, and to acknowledge user selection from the categories corresponding to the subspaces thus extracted; and
    the control unit moves the viewing position to a predetermined position in the subspace corresponding to the category selected by the selector.

6. The data management apparatus according to claim 5, further comprising:
    a map display unit operative to display a map showing the entirety of the data element space,
    wherein the selector acknowledges user selection from the categories corresponding to the subspaces displayed in the map.

7. The data management apparatus according to claim 1, wherein: the storage device is further operative to store positional information on a plurality of guides, each guide indicating a position of one of the data elements in the data element space having a certain characteristic; and the control unit is further operative to: receive a user selection from among the guides that are displayed, and move the viewing position in at least proximity with the selected guide.

8. The data management apparatus according to claim 1, further comprising: a category information display unit operative to display information related to the category corresponding to the subspace to which the viewing position belongs to or a subspace close to the viewing position.

9. The data management apparatus according to claim 8, wherein the category information display unit displays the direction of a subspace close to the viewing position and information related to the category corresponding to the subspace.

10. The data management apparatus according to claim 1, wherein the display unit displays an object belonging to a subspace different from the subspace to which the viewing position belongs to in a display format different from an object belonging to the subspace to which the viewing position belongs to.

11. The data management apparatus according to claim 1, wherein the plurality of data elements are organized into categories in a plurality of layers, subspaces hierarchized according to the layers of categories are placed in the data element space, and the control acknowledges an instruction for moving the viewing position to a subspace at a layer different from that of the subspace to which the viewing position belongs to, so as to move the viewing position to a predetermined position in the destination subspace.

12. A data management method comprising:
   creating a data element space by organizing a plurality of data elements into a plurality of categories, assigning a subspace to each of the plurality of categories, placing a plurality of subspaces in a multidimensional space, and distributing, in each of the subspaces respectively assigned to the plurality of categories, where objects represent data elements belonging to the associated category based upon attribute information of the data elements;
   storing in a computer readable storage medium positional information on the objects in the data element space;
   establishing a viewing position and a viewing direction in the data element space, and generating and displaying on a display device an image of the data element space by referring to the storage device and by rendering the objects located in the data element space, wherein: (i) each subspace of each category is defined by a substantially circular perimeter, a substantially central point within the subspace, and a plurality of axes extending from the central point towards the perimeter; (ii) each axis represents a respective attribute of the data elements defined by the attribute information thereof such that the data elements are distributed along the respective axes in accordance with the attributes thereof; (iii) respective axes of the plurality of subspaces having at least similar attributes are oriented in a substantially common angular position about the respective central points of the plurality of subspaces; (iv) respective subspaces having substantially similar attribute information are located closer together than respective subspaces having relatively different attribute information; and (v) only subspaces that are placed in the multidimensional space within a predetermined distance from the viewing position and in the viewing direction by referring to the storage device are displayed and any subspaces beyond the predetermined distance and outside the viewing direction are not displayed; and
   receiving from an input device an instruction from a user to change the viewing position or viewing direction, and changing the viewing position or viewing direction in response to the user instruction.

13. A computer program embedded on a non-transitory computer-readable recording medium, the computer program when executed by a processor causes the processor to perform actions, comprising:
   creating a data element space by organizing a plurality of data elements into a plurality of categories, assigning a subspace to each of the plurality of categories, placing a plurality of subspaces in a multidimensional space, and distributing, in each of the subspaces respectively assigned to the plurality of categories, where objects represent data elements belonging to the associated category based upon attribute information of the data elements;
   storing in a computer readable storage medium positional information on the objects in the data element space;
   establishing a viewing position and a viewing direction in the data element space, and generating and displaying on a display device an image of the data element space by referring to the storage device and by rendering the objects located in the data element space, wherein: (i) each subspace of each category is defined by a substantially circular perimeter, a substantially central point within the subspace, and a plurality of axes extending from the central point towards the perimeter; (ii) each axis represents a respective attribute of the data elements defined by the attribute information thereof such that the data elements are distributed along the respective axes in accordance with the attributes thereof; (iii) respective axes of the plurality of subspaces having at least similar attributes are oriented in a substantially common angular position about the respective central points of the plurality of subspaces; (iv) respective subspaces having substantially similar attribute information are located closer together than respective subspaces having relatively different attribute information; and (v) only subspaces that are placed in the multidimensional space within a predetermined distance from the viewing position and in the viewing direction by referring to the storage device are displayed and any subspaces beyond the predetermined distance and outside the viewing direction are not displayed; and
   receiving from an input device an instruction from a user to change the viewing position or viewing direction, and changing the viewing position or viewing direction in response to the user instruction.

* * * * *